(12) United States Patent
Akita et al.

(10) Patent No.: US 10,464,536 B2
(45) Date of Patent: Nov. 5, 2019

(54) ADAPTIVE VEHICLE BRAKING SYSTEMS, AND METHODS OF USE AND MANUFACTURE THEREOF

(71) Applicant: Honda Motor Co., Ltd., Tokyo (JP)

(72) Inventors: Yuichiro Akita, Dublin, OH (US); Lorne R. Dyar, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 15/349,690

(22) Filed: Nov. 11, 2016

(65) Prior Publication Data

US 2018/0134261 A1    May 17, 2018

(51) Int. Cl.
| | |
|---|---|
| *B60T 8/60* | (2006.01) |
| *B60T 7/04* | (2006.01) |
| *B60L 7/26* | (2006.01) |
| *B60T 8/32* | (2006.01) |

(52) U.S. Cl.
CPC ............... *B60T 7/042* (2013.01); *B60L 7/26* (2013.01); *B60T 8/3255* (2013.01); *B60L 2250/26* (2013.01); *B60T 2220/04* (2013.01); *B60T 2270/604* (2013.01)

(58) Field of Classification Search
CPC ...... B60T 8/3255; B60T 8/326; B60T 8/3265; B60T 2220/04; B60T 7/042
See application file for complete search history.

(56) References Cited

U.S. PATENT DOCUMENTS

| | | | |
|---|---|---|---|
| 6,007,160 A | 12/1999 | Lubbers et al. | |
| 6,267,208 B1 * | 7/2001 | Koepff | B60T 7/042 188/156 |
| 6,309,031 B1 * | 10/2001 | Crombez | B60T 7/042 303/113.4 |
| 6,367,889 B1 * | 4/2002 | Tsubouchi | B60T 7/042 303/113.4 |
| 6,471,304 B1 | 10/2002 | Deml et al. | |

(Continued)

FOREIGN PATENT DOCUMENTS

| | | |
|---|---|---|
| CN | 1701015 A | 11/2005 |
| CN | 103231705 A | 8/2013 |

(Continued)

OTHER PUBLICATIONS

Abstract for Aleksendric, D., Cirovic, V., and Smiljanic, D., "Brake Pedal Feel Control Model," SAE Technical Paper 2015-01-2674, 2015, doi:10.4271/2015-01-2674. Sep. 7, 2015.

(Continued)

*Primary Examiner* — Nicholas J Lane
(74) *Attorney, Agent, or Firm* — Kenealy Vaidya LLP

(57) ABSTRACT

Some embodiments are directed to a controller is provided for use with a vehicle braking system. The braking system can include brake assemblies coupled to an actuator. The controller can be configured to: receive data indicative of a requested braking force; select a distance of travel and actuating force for the actuator from respective predetermined ranges of values that are based on a curve determined using discrete portions representing constant incremental area under the curve for constant workload; and signal the brake assemblies to output braking response based on the selected distance of travel and actuating force of the actuator.

18 Claims, 6 Drawing Sheets

(56) References Cited

U.S. PATENT DOCUMENTS

| | | |
|---|---|---|
| 7,805,232 B2 | 9/2010 | Karnjate et al. |
| 8,172,338 B2 | 5/2012 | Karnjate et al. |
| 8,474,348 B2 | 7/2013 | Soltys et al. |
| 8,523,297 B2 | 9/2013 | Morishita |
| 9,242,565 B2 | 1/2016 | Kleickmann et al. |
| 9,561,786 B2 * | 2/2017 | Shand .................. B60T 8/3255 |
| 9,707,945 B2 * | 7/2017 | Sakurazawa .......... B60T 8/4081 |
| 2005/0269871 A1 | 12/2005 | Saito |
| 2009/0199555 A1 * | 8/2009 | Hatano .................. B60T 8/489 60/545 |
| 2011/0130935 A1 * | 6/2011 | Krueger .................. B60T 7/042 701/70 |
| 2012/0139328 A1 | 6/2012 | Brown et al. |
| 2013/0289845 A1 * | 10/2013 | Ajiro ...................... B60T 7/042 701/70 |
| 2014/0008966 A1 * | 1/2014 | Hotani .................. B60T 8/4081 303/14 |
| 2014/0136069 A1 * | 5/2014 | Jung ..................... B60T 13/662 701/70 |
| 2014/0292065 A1 * | 10/2014 | Jeon ........................ B60T 7/042 303/10 |
| 2015/0021981 A1 | 1/2015 | Shimada et al. |
| 2015/0035352 A1 * | 2/2015 | Fujiki .................... B60T 7/042 303/15 |
| 2015/0224972 A1 * | 8/2015 | Feigel .................. B60T 8/4081 303/15 |
| 2015/0232076 A1 * | 8/2015 | Oosawa ................ B60T 8/3275 303/10 |
| 2015/0239350 A1 | 8/2015 | Maucher et al. |
| 2015/0321649 A1 * | 11/2015 | Jeon ........................ B60T 8/58 701/70 |
| 2015/0352960 A1 | 12/2015 | Okano et al. |

FOREIGN PATENT DOCUMENTS

| | | |
|---|---|---|
| CN | 104309597 A | 1/2015 |
| EP | 2460701 A2 | 6/2012 |
| JP | H11278249 A | 10/1999 |
| WO | 2013026459 A1 | 2/2013 |

OTHER PUBLICATIONS

Abstract for Day, A., Ho, H., Hussain, K., and Johnstone, A., "Brake System Simulation to Predict Brake Pedal Feel in a Passenger Car," SAE Technical Paper 2009-01-3043, 2009, doi:10.4271/2009-01-3043. Oct. 11, 2009.

Abstract for Zehnder, J., Kanetkar, S., and Osterday, C., "Variable Rate Pedal Feel Emulator Designs for a Brake-By-Wire System," SAE Technical Paper 1999-01-0481, 1999, doi:10.4271/1999-01-0481. Mar. 1, 1999.

* cited by examiner

ADAPTIVE VEHICLE BRAKING SYSTEMS, AND METHODS OF USE AND MANUFACTURE THEREOF

BACKGROUND

The disclosed subject matter relates to adaptive vehicle braking systems, and methods of use and manufacture thereof. More particularly, the disclosed subject matter relates to methods and apparatus that enhance vehicle operator feedback during regenerative brake blending of hybrid vehicles.

Vehicle braking systems, particularly adaptive braking systems, enhance hybrid vehicle performance by controlling regenerative brake blending in which an electric motor functions as a generator to slow the vehicle, in conjunction with traditional braking systems. Electric actuation is used to achieve high performance operation of vehicles having hybrid powertrains by precisely controlling regenerative brake blending. These systems can offer tailored pressure control maps to meet brake pedal deceleration controllability.

SUMMARY

According to one aspect, a controller is provided for use with a vehicle braking system, the braking system including brake assemblies coupled to an actuator. The controller is configured to: receive data indicative of a requested braking force; select a distance of travel and actuating force for the actuator from respective predetermined ranges of values that are based on a curve determined using discrete portions representing constant incremental area under the curve for constant workload; and signal the brake assemblies to output braking response based on the selected distance of travel and actuating force of the actuator.

According to another aspect, a braking system for a vehicle is provided. The braking system can include at least one brake assembly. The braking system can also include an actuator configured to engage and disengage the at least one brake assembly. The braking system can further include a controller in electronic communication with the at least one brake assembly and the actuator. The controller is configured to: receive data indicative of a requested braking force; select a distance of travel and actuating force for the actuator from respective predetermined ranges of values that are based on a curve determined using discrete portions representing constant incremental area under the curve for constant workload; and signal the at least one brake assembly to output braking response based on the selected distance of travel and actuating force of the actuator.

According to yet another aspect, a method can be provided for calibrating a vehicle braking system that includes brake assemblies coupled to an actuator, the method comprising: receiving data indicative of a requested braking force; selecting a distance of travel and actuating force for the actuator from respective predetermined ranges of values that are based on a curve determined using discrete portions representing constant incremental area under the curve for constant workload; and signaling the brake assemblies to output braking response based on the selected distance of travel and actuating force of the actuator.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
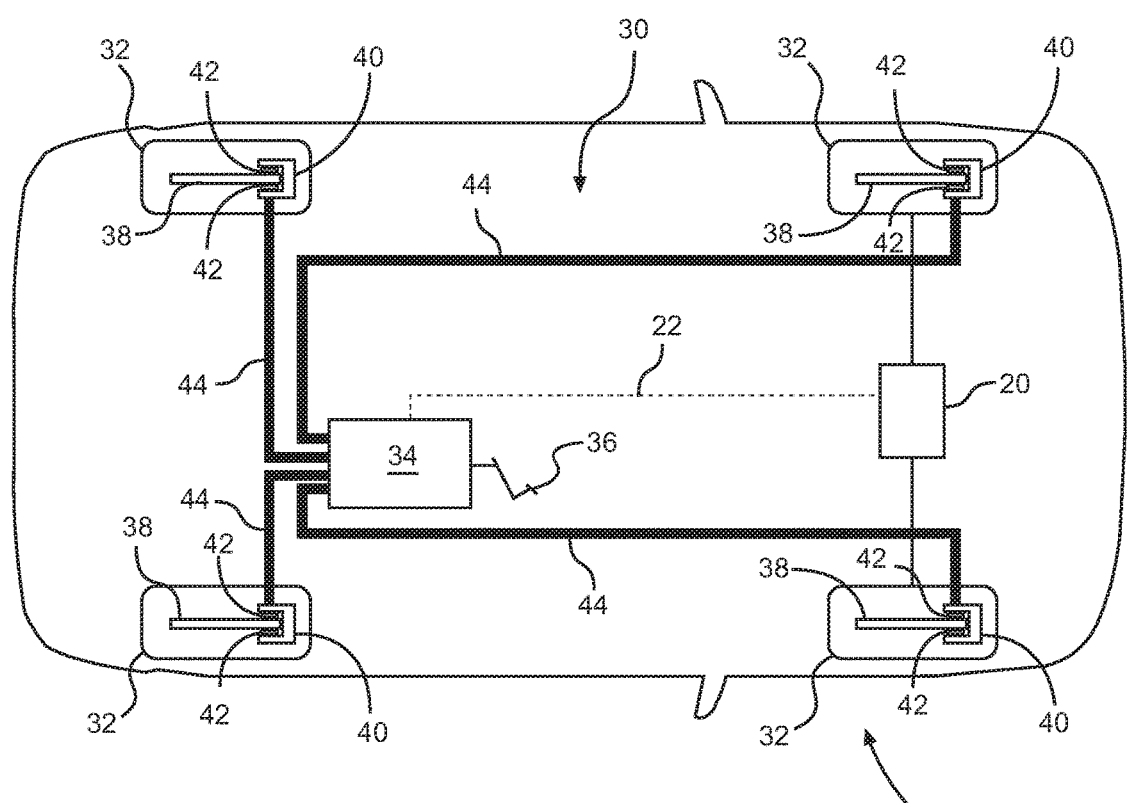
FIG. 1 is a schematic view of exemplary power and braking systems for a vehicle in accordance with the disclosed subject matter.

Overall, the disclosed embodiments of an adaptive vehicle braking system focus on setting targets for human-centered high performance, i.e., sports car driving that delivers a unique way to further allow complete control of the vehicle dynamics with the driver's exact intentions. Intuitive brake feeling is defined as allowing the driver to easily find the intended deceleration response without unintentional sacrifices. This concept is based on human kinesthetic learning. Tactile learning can benefit drivers to engage the brake controls to extract the exact desired deceleration.

The brake pedal tuning system disclosed herein is for electric or hybrid vehicles. Traditional automotive vehicles typically utilize a brake pedal linked to a vacuum booster actuation system to control deceleration by hydraulic pressure control. Since the vacuum booster has limited tuning capability. electric actuation can be used to customize the output pressure to achieve a higher level of tuning capability.

The system therefore uses an electronic actuating mechanism to achieve a predictable braking as experienced by the driver. To accomplish this task, the brake pedal operation needs to be coupled to human sensations. A progressive rate pedal stroke and pedal force workload is established to enable a buildup sensation to braking force lock point. A pedal stroke (i.e., pedal travel distance) is mapped against pedal force range into the system through previously collected data (e.g. drivers' leg movements). In other words, the stroke and force modulation range is established based on traditional leg muscle memory movement. Based on the established ranges, the system will determine the travel/force curve to apply during braking control as described below.

As the driver depresses the pedal, the pedal force felt by the driver will increase in a progressive and predictable manner to give the driver a "buildup sensation" through the pedal. As discussed in more detail below, pedal force is increased by keeping workload constant as the pedal is stroked (i.e., discrete segments of curve providing a constant incremental area under the curve for representing the same amount of workload as stroke minimizes and force increases). This will provide the driver with intuitive pedal feeling with predictive control.

The system could also be incorporated into an integrated dynamic system (IDS) allowing for selection of different response characteristics in differing driving settings (e.g., city, winding road, track). In general, sports cars are driven on anything ranging from urban streets to winding backroads and racetracks. Each of these scenarios has ideal vehicle performance targets. The brake feeling must be intuitive and consistent to allow harmonious sensations with the scenario.

In the case of a city environment, the vehicle controls are generally second nature and without much thought. The deceleration must be easy to control without unexpected system output. In addition, the pedal force must be appropriately set to prevent tiresomeness under everyday stop-and-go workload.

In the case of the winding backroad environment, the driver is more engaged with the vehicle dynamics. The driver demands progressive and predicable control of the system as they enjoy the vehicles handling performance. The systems' stroke/force progressive buildup must be harmonious with the progressive setting of the chassis. This smooth control compliments the effortless transient movement.

In the case of the racetrack driving environment, the driver is occupied with maximizing peak performance to achieve the lowest lap time. This scenario demands ultimate control of threshold and trail braking to maximize tire grip. In addition, minimal feeling changes must occur with thermal changes under high energy driving to enable brake consistency as the driver continues to lap the track.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

FIG. 1 is a schematic view of power and braking systems 20, 30 for a vehicle 10 in accordance with the disclosed subject matter. The exemplary power system 20 of the present embodiment is configured as a hybrid power unit including an engine, a transmission, and an electric motor. Some embodiments may include multiple electric motors such as two, three, four, five, etc. The power system 20 is configured to communicate with the braking system 30 by a communication line 22.

The exemplary braking system 30 includes brake assemblies 32 connected to a brake force control system 34 by brake lines 44, where the brake force control system 34 includes a pedal 36 by which a vehicle operator (i.e., driver) can operate the brake assemblies 32. Each of the brake assemblies 32 includes a brake disc 38, a caliper 40, and brake pads 42.

The disclosed braking system 30 achieves an intuitive brake feeling in a variety of driving conditions, ultimate track performance and reduction of $CO_2$ emissions per vehicle. The system 30 integrates brake-by-wire with high-performance braking hardware.

I. Overview

Advances in hybrid power train technology achieve ultimate vehicle performance while reducing $CO_2$ emissions. New powertrain technologies enable instantaneous acceleration and torque vectoring for direct yaw control to enhance vehicle dynamics and driver enjoyment. Such systems also enable manufacturers to tailor vehicle chassis response to varied driving scenarios by allowing the driver to select settings ranging from electric (i.e., quiet mode) to hybrid propulsion (i.e., track mode). The integration of these new devices, developed with traditional sports car fundamentals, enables the driver to experience consistent peak performance, new levels of controllable line trace while cornering and reduced $CO_2$ emissions through regenerative braking. To achieve high performance with a hybrid power train, the braking system assists in powering the chassis control devices. The braking system captures regenerative braking energy to boost performance without sacrificing vehicle dynamics control. In addition, the brakes support the IDS to allow the driver to easily control the vehicle's deceleration with the brake pedal.

Sports cars typically utilize a brake pedal linked to a vacuum booster actuation system to control deceleration by hydraulic pressure control. This system, connected to a high-performance brake corner hardware system, generally offers sports car brake deceleration controllability under at-limit performance at the track. This single-priority tuning for one chassis response sacrifices controllability in other areas. Non-hybrid powertrains do not require regenerative braking control; therefore, they do not require new actuation technology.

To maximize vehicle dynamic performance from a hybrid power train, electric actuation must be used to precisely control regenerative and friction brake blending. This system can support the IDS by offering tailored pressure control maps to meet brake pedal deceleration controllability to be intuitive and consistent in all of the IDS settings. Intuitive brake pedal control means the driver has a clear and predictable sense of deceleration based on their braking intention. Consistency means the controllability and repeatability is maintained in a wide range of driving scenarios, from city streets to race tracks. In other words, the system can support the IDS to faithfully translate the braking inputs of the driver with incredible fidelity and virtually zero delay, thus amplifying the capabilities of every driver, while greatly elevating the dynamic experience in a wide range of driving situations.

II. Brake Pedal Workload

Intuitive brake feeling occurs when the driver can easily receive the intended deceleration response without unintentional sacrifices to handling or performance. This concept is based on kinesthetic, or tactile, learning, which is learning by performing a physical activity. Intuitive braking enables drivers at all levels, from novice to professional, to engage with the brake controls and extract the desired deceleration. To accomplish an intuitive braking feeling, brake pedal operation must be coupled with human sensation.

Figure 4:
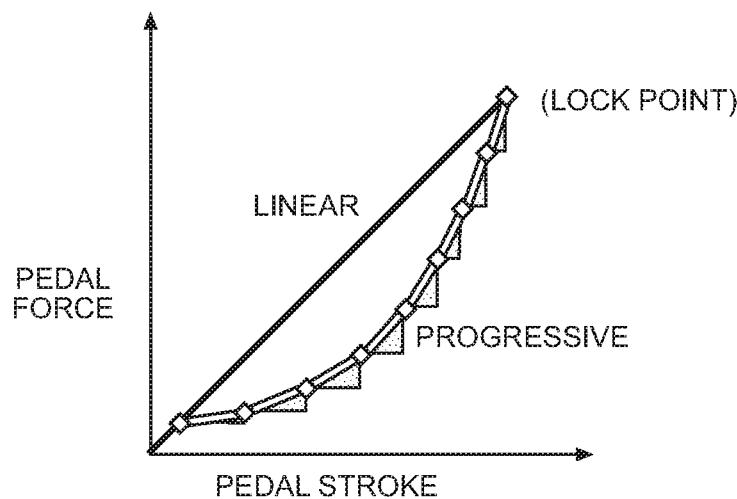
FIG. 4 is a graph of pedal workload of the system in accordance with the disclosed subject matter.

FIG. 4 is a graph of pedal workload of the system in accordance with the disclosed subject matter. As shown in FIG. 4, a progressive rate of pedal stroke and pedal force workload, where work is equal to the product of stroke distance and force on the pedal, is established to enable a buildup sensation to the braking force lock point.

The stroke and force modulation range was established based on traditional leg muscle memory movement. The pedal operation workload is constant, with smooth ratio changes that allow the driver to maintain the same amount of workload, as the stroke minimizes and the force increases, to establish the buildup feeling.

Figure 5:
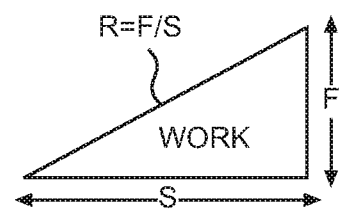
FIG. 5 is a graph of pedal stroke and pedal force in accordance with the disclosed subject matter.
Figure 6:
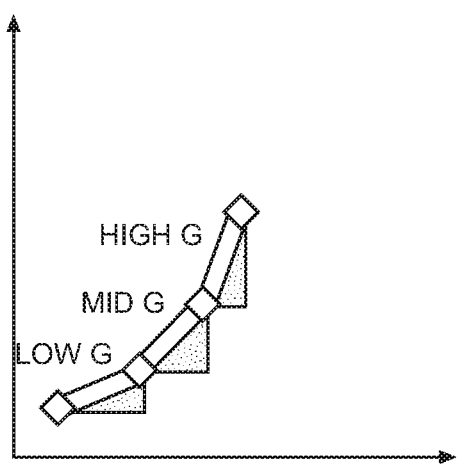
FIG. 6 is a graph of predictable brake pedal operation in accordance with the disclosed subject matter.
Figure 7:
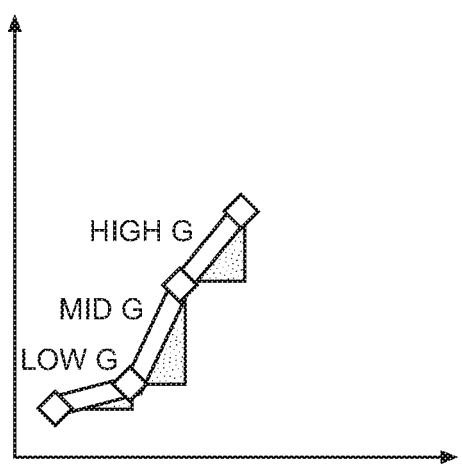
FIG. 7 is a graph of unpredictable brake pedal operation in accordance with the disclosed subject matter.

FIG. 5 is a graph of pedal stroke and force in accordance with the disclosed subject matter. The ratio R of the pedal stroke S to the pedal force F transitions up to the lock point shown in FIG. 4, with the area of the triangle equating to work. The curve shown in FIG. 4 manages the ratio R such that the work is constant throughout the braking progression. FIG. 6 is a graph of predictable brake pedal operation, and FIG. 7 is a graph of unpredictable brake pedal operation in accordance with the disclosed subject matter. In FIG. 6, the work is constant with smooth changes of the ratio R of pedal force F over pedal stroke S across the triangular increments shown. FIG. 6 therefore represents predictable and therefore intuitive characteristics of the pedal 36 of the braking system 30. Conversely, FIG. 7 shows ratio R changes that are not smooth and therefore create a disjointed rather than progressive braking progression, with inconsistent changes in pedal stroke S and pedal force F approaching the lock point. FIG. 7 therefore represents unpredictable braking characteristics not present in the disclosed braking system 30, and illustrates differences from traditional braking systems. As shown in FIGS. 4 and 6, the constant workload (area under the curve) of the present embodiment of the braking system 30 provides an intuitive pedal operation modulation with the buildup sensation.

III. Multiple Driving Scenarios

In general, sports cars are driven on city streets, winding roads and race tracks. Each of these scenarios has ideal vehicle performance targets. The brake feeling must be intuitive and consistent to allow a harmonious feeling with each scenario.

In the city scenario, vehicle controls are generally second nature and mindless. Deceleration must be easy to control without unexpected system output. Additionally, pedal force must be set appropriately to prevent weariness in everyday stop-and-go workloads.

In the winding road scenario, the driver is more engaged with the vehicle dynamics. The driver demands progressive and predictable control of the system while enjoying the vehicle handling performance. The system's progressive buildup of stroke and force must be harmonious with the progressive setting of the chassis. This smooth control complements the effortless transient movement.

In the track driving scenario, the driver is focused on maximizing peak performance to achieve the shortest lap time. This scenario demands ultimate control of threshold and trail braking to maximize tire grip. Additionally, the thermal changes that occur under high-energy driving must be minimally felt to enable braking consistency as the driver continues their lap time attack, without undue brake fade, for instance.

IV. System Hardware and Processes

Technology used in advanced braking systems can be broken down into four areas: actuation system, corner hardware, system cooling and system integration.

A. Actuation System

An electro-servo brake (ESB) system was facilitates cooperative control of regenerative and hydraulic brakes. Regenerative braking is required to charge the hybrid powertrain for electric motor propulsion, torque vectoring and reduced fuel consumption from an internal combustion engine. The present embodiment of the braking system 30 yields ESB smooth blending between regenerated electric energy and hydraulic pressure in braking functions.

In conventional brake systems, there is a fixed relationship between brake line pressure and pedal stroke. The ESB system achieves variable servo ratio control applied by conventional brake pedal operation, as shown in detail in FIG. 2 and described below. Therefore, in a conventional system, IDS brake feel cannot be achieved because high-accuracy brake control only applies to one setting.

1. Hardware

Figure 2:
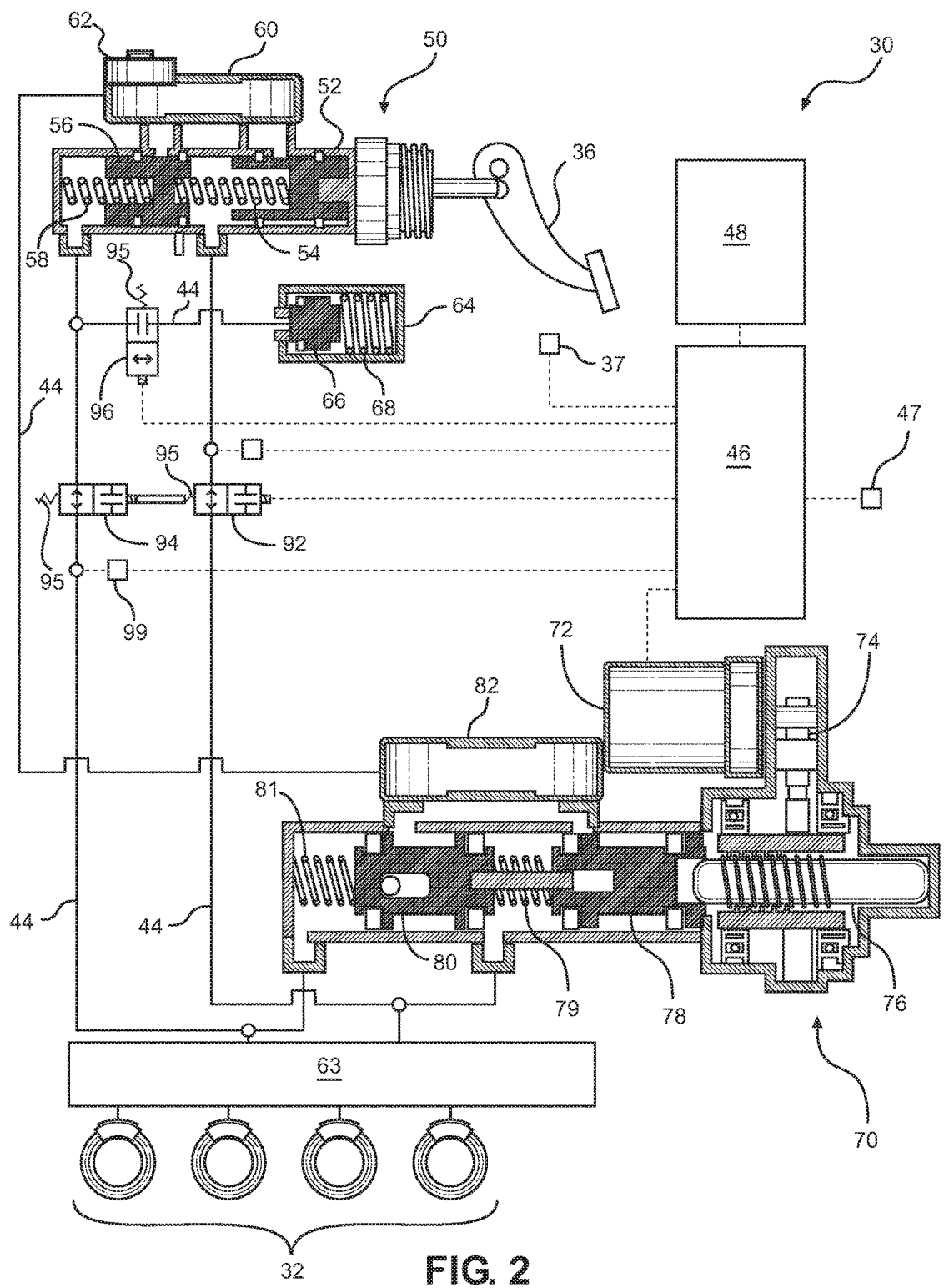
FIG. 2 is a detailed schematic view of the exemplary braking system in accordance with the disclosed subject matter.

FIG. 2 is a detailed schematic view of the exemplary braking system 30 in accordance with the disclosed subject matter. The system 30 in FIG. 2 includes a master cylinder assembly 50 and a slave cylinder assembly 70 coupled to the brake assemblies 32. A processor (ECU) 46 in communication with an electric motor and regenerative braking controller 48 controls operation of the braking system 30. As will be described below, the processor 46 can include a drive mode select switch 47 to enable a vehicle operator to switch between various driving modes suited to various scenarios such as city and track driving.

The master cylinder assembly 50 includes the pedal 36 connected to a first piston 52, a first spring 54, a second piston 56 and a second spring 58. A pedal sensor 37 is in communication with the pedal 36 to sense stroke distance. A chamber surrounding the aforementioned pistons and springs is connected to a first reservoir 60 having a cap 62. The master cylinder assembly 50 facilitates pressurization of hydraulic fluid in the brake lines 44 to actuate the brake assemblies 32 as a result of the pedal 36 being depressed. Specifically, the brake assemblies 32 are controlled by a brake modulator 63 to effectively distribute hydraulic pressure thereto.

The brake lines 44 by which the master cylinder assembly 50 is connected to the brake modulator 63 can be opened or closed via first and second valves 92, 94 depending on whether or not regenerative braking is activated, as described in more detail below. Valve springs 95 bias the first and second valves 92, 94 open and the third valve 96 closed under normal operation. When regenerative braking is deactivated, the first and second vales 92, 94 are open and depressing the pedal 36 serves to actuate the brake assemblies 32. However, when regenerative braking is activated, the first and second vales 92, 94 can be partially or fully closed to disconnect the master cylinder assembly 50 from the brake modulator 63. As will be described below, regenerative braking instead utilizes the slave cylinder assembly 70 to actuate the brake assemblies 32 via the brake modulator 63. In order to continue to provide braking feedback to the vehicle operator, a simulator 64 including a third piston 66 and a third spring 68 is connected to the master cylinder assembly 50. In this setup, depressing the pedal 36 pressurizes the brake lines 44 ahead of the first and second valves 92, 94, which thereby acts on the internals of the simulator 64 to provide feedback from the hydraulic pressure to the vehicle operator. The brake line 44 connecting the simulator 64 to the master cylinder assembly 50 also includes a third valve 96 that opens and closes opposite the first and second valves 92, 94. Each of the valves is also in communication with the processor 46 to communicate pressure in the brake lines 44, and a first pressure sensor 98 is disposed at the first valve 92 on connected brake line 44 to determine system pressure ahead of the first and second valves 92, 94 when they are closed.

Figure 3:
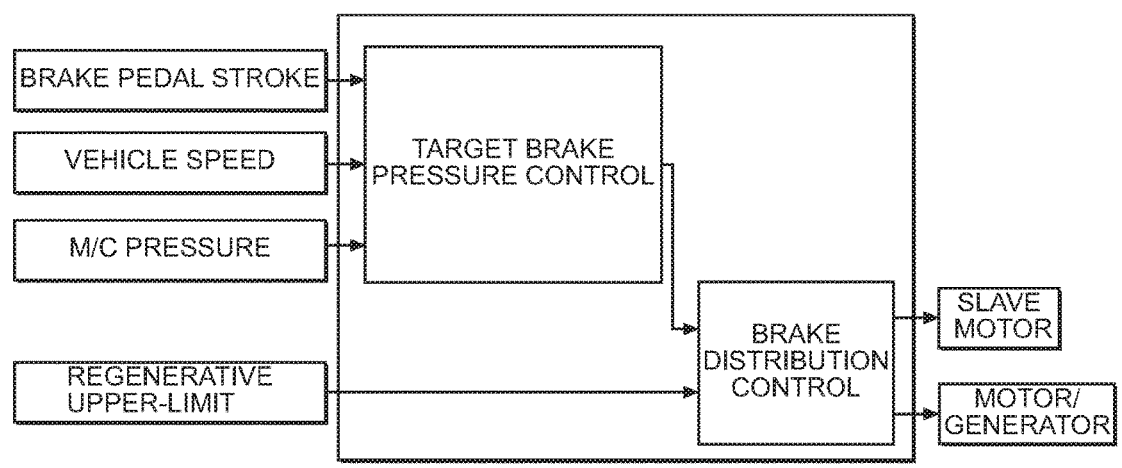
FIG. 3 is a schematic view of brake blending ratio control in accordance with the disclosed subject matter.

The slave cylinder assembly 70 includes a slave motor 72 connected to a ball screw 76 by a driveshaft 74, the screw 76 being coupled with a fourth piston 78 and fourth spring 79, and fifth piston 80 and fifth spring 81. A chamber surrounding the aforementioned pistons and springs is connected to a second reservoir 82 connected to the first reservoir 62 by the brake line 44. The slave cylinder assembly 70 facilitates pressurization of hydraulic fluid in the brake lines 44 to actuate the brake assemblies 32 as a result of the slave motor 72 being actuated by the processor 46. Specifically, the brake assemblies 32 are controlled by a brake modulator 63 to effectively distribute hydraulic pressure thereto. As shown in FIG. 3 and described below, the slave cylinder assembly 70 is configured to deliver the appropriate braking pressure to the brake modulator 63 given a position of the pedal 36, regardless of whether regenerative braking has been activated. The processor 46 receives intended system pressure from the first pressure sensor 98, and then administers corresponding pressure via the slave cylinder assembly 70, which can then be monitored by the second pressure sensor 99.

This ESB system adopts new pressure control logic to accomplish precise pedal feel at high pedal input. It calculates target pressure demand based on the master cylinder pressure signal. FIG. 3 is a schematic view of brake blending ratio control in accordance with the disclosed subject matter. As shown in FIG. 3, the brake pedal stroke, vehicle speed, and master cylinder assembly system pressure are all input to the processor to calculate target brake pressure control, which selects which braking map to apply. That information, along with an upper-limit regenerative braking force the motor is able to provide, are analyzed by the processor to determine brake distribution control. Brake distribution control analyzes whether the target brake pressure control can be achieved with just regenerative braking, or if hydraulic braking needs to supplement the regenerative braking to achieve the target brake pressure given the operator input via the pedal. Ultimately, the processor proceeds from brake distribution control to instruct the slave motor and/or the regenerative braking motor/generator to match the braking input from the pedal.

Other electric servo brake systems use the pedal stroke signal only to calculate target pressure based on driver demand. That generates higher levels of hysteresis when high deceleration and pedal forces are required due to resolution limitations. These limitations obstruct the driver's ability to precisely control pedal modulation.

2. Control Logic

Figure 8:
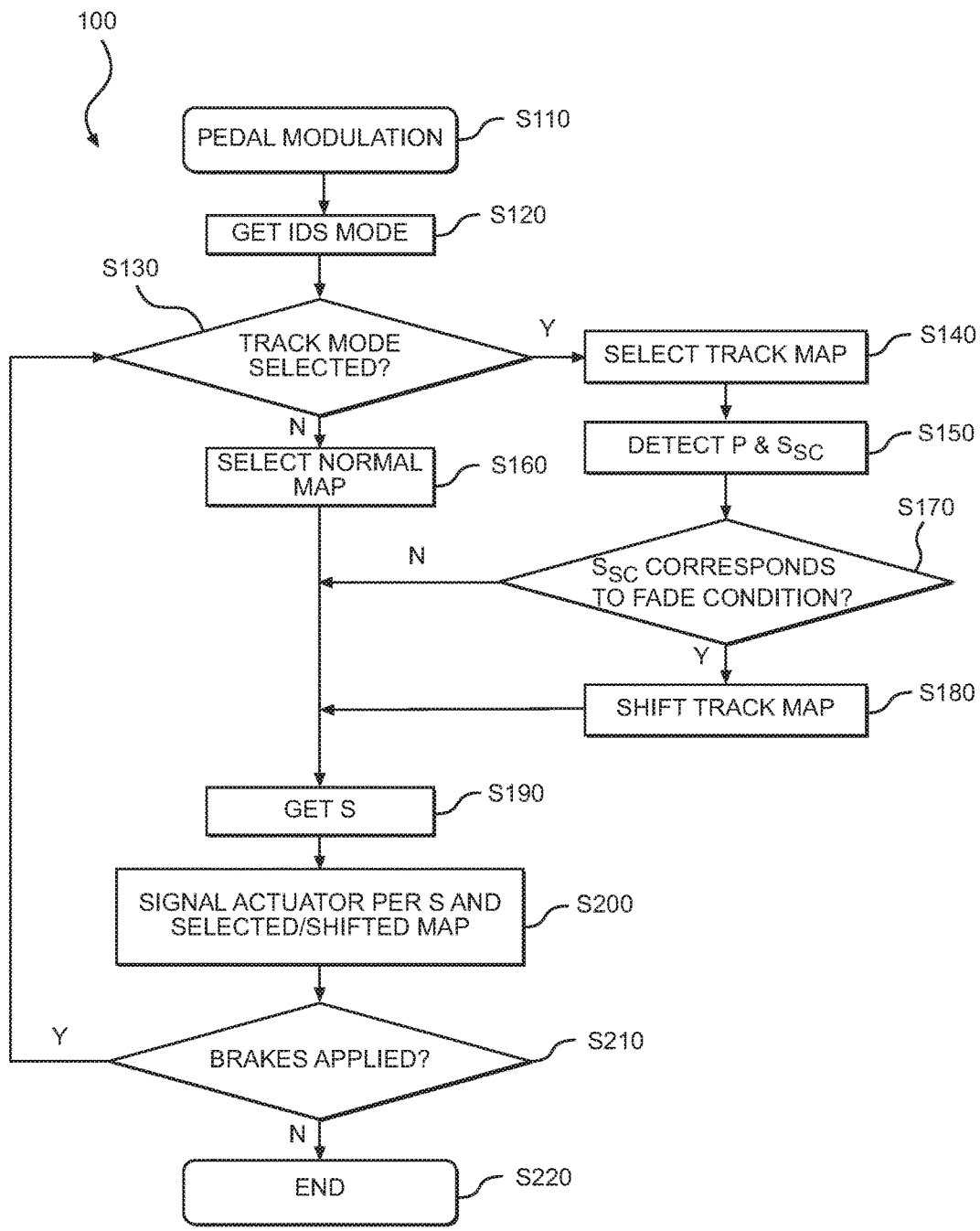
FIG. 8 is a flowchart of control logic of the braking system in accordance with the disclosed subject matter.

FIG. 8 is a flowchart of control logic of the braking system in accordance with the disclosed subject matter. The control logic 100 for the processor shown in FIG. 8 is initiated by pedal modulation at step S110, in the form of operator/driver braking input on the pedal with the intent to engage the vehicle brakes.

Once the driver has shown intent to use the braking system by modulating the pedal, the IDS mode is determined at step S120. The IDS mode may be set to city driving, track driving, etc., each of which have unique driving characteristics desired. The logic then proceeds to check whether or not track mode, or an equivalent race-inspired high performance mode, is selected as the IDS mode at step S130. If it is determined that track mode has not been selected, the logic proceeds to select a normal map at step S160. Once a normal map has been selected, the pedal stroke S is determined from the pedal sensor at step S190. Given the pedal stroke S, the braking map is shifted to compensate for potential performance degradation at step S200.

After the above described steps have been initiated, the logic then determines whether or not the brakes are still being applied at step S210. If the brakes are no longer being applied, the logic ends at step S220. If the brakes are indeed still being applied, the logic proceeds back to step S130 to determine whether or not track mode is selected.

If at step S130 it is determined that track mode is selected, the logic proceeds to select the track map for the braking system performance at step S140, as the track map for the braking system may be only one of several different system maps configured to be included within track mode. Having selected the track map for the braking system at step S140, the logic proceeds to detect brake pressure P in the system ahead of the valves and the system stroke change of the slave cylinder at step 150. Having detected system pressure P and stroke change of the slave cylinder, the logic determines whether or not those metrics indicate a fade condition of the brake assemblies at step S170. If a fade condition is not indicated, the logic proceeds to step S190 to determine the pedal stroke from the pedal sensor at step S190. At this point, the logic follows the above described path to step S200 and subsequent steps.

Figure 9:
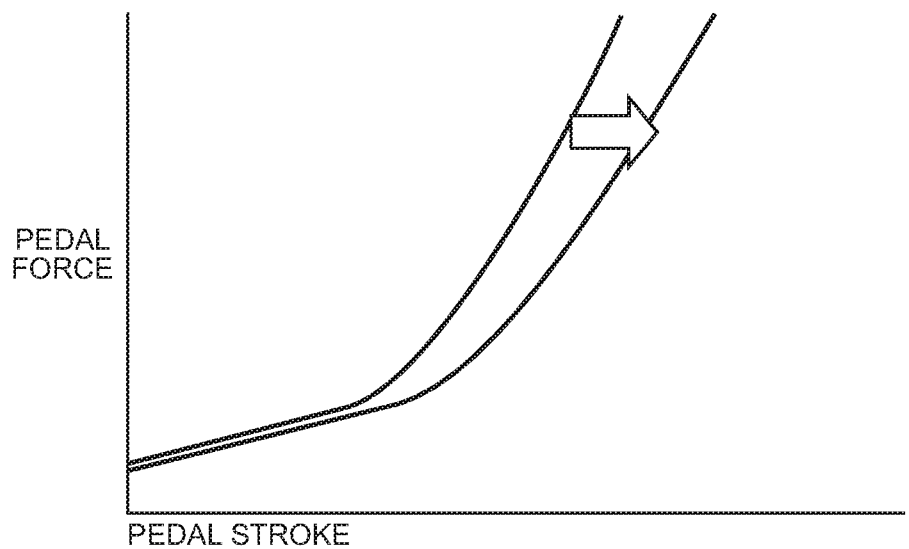
FIG. 9 is a graph of brake fade consideration regarding pedal stroke and force.
Figure 10:
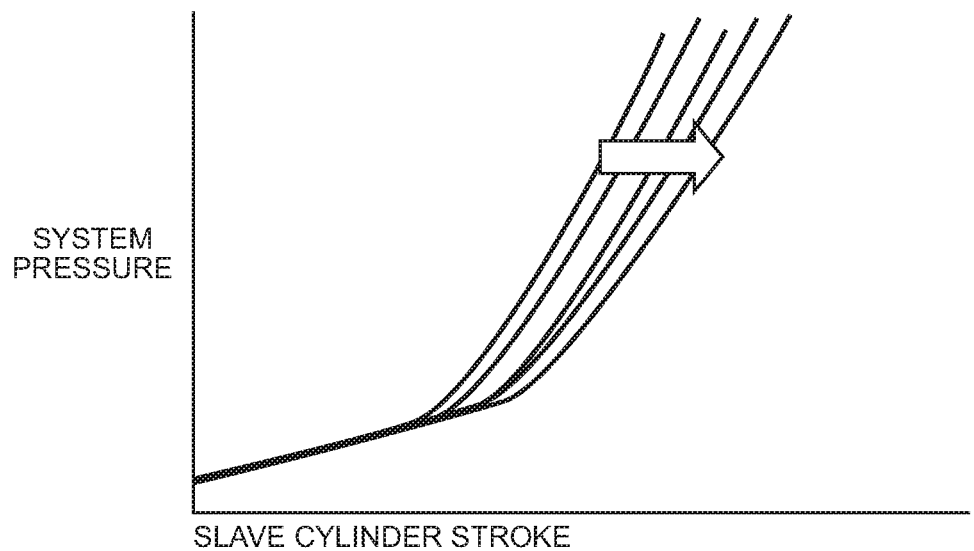
FIG. 10 is a graph of brake fade consideration regarding slave cylinder stroke and system pressure.

If at step S170 a fade condition is detected, the logic proceeds to step S180 at which the braking system shifts the track map. The track map parameters can be shifted as shown in FIGS. 9 and 10 to accommodate the detected fade and thereby ensure the braking system maintains intuitive brake feeling for the vehicle operator. Specifically, the system can artificially apply more braking force to the degraded braking system given the same operator input in the form of pedal stroke and force.

This control logic ensures that despite wear and tear of vehicle operation, the vehicle and braking system continue to offer the intuitive feedback and buildup sensation to the driver to enhance operability of the vehicle.

B. Brake Assembly Hardware

Lightweight components can be used to further control total system weight. This braking system can apply carbon ceramic matrix (CCM) brake disk material due to its low density and light weight, low displacement fixed aluminum calipers. The combination of these components offers a reduction in unsprung mass over other vehicle braking systems. Friction material selection is based on its balance with the following established controllability priorities: mu variation based on thermal effects, mu variation due to speed sensitivity and minimum wear characteristics based on continuous lapping.

C. System Cooling

Disk and caliper sizing are optimized based on the cooling performance of the exemplary vehicle layout. The brake cooling layout is integrated into the overall flow balance to optimize aerodynamic drag, vehicle lift, down force and brake cooling. The brake system cooling focus was to ensure brake pad temperatures stabilized during at-limit lapping. This was accomplished by optimizing the air flow to the front and rear brake calipers and disks. The target brake pressure control and brake distribution control, as discussed above and shown in FIG. 3, assist the braking system in maintaining operable brake pad temperatures that do not negatively affect vehicle performance.

D. System Integration

The electro-servo brake system is a brake-by-wire system that needs to integrate the demands of a sports car system. The corner hardware and cooling system manages the heat, but the actuation system must actively control the pressure maps based on the fluid consumption demand in each driving scenario.

One example of this integration is the consideration of pressure control map changes based on effectiveness to achieve intuitive brake pedal feel in a wide range of conditions. Friction material generally offers different levels of performance at different temperatures. To enable clear driver control, another pressure map is included to compensate for track (circuit) driving, enabling the driver to maintain the controllability feeling that was experienced at city or winding road driving.

For example, the IDS adapted to public road driving may have the following braking system characteristics: ambient (approximately 100 degrees Celsius) brake pad temperature, low brake pad coefficient of friction, low caliper fluid consumption, with the ESB calibrated for the best setting for intuitive feeling. Another example has the IDS adapted to track driving, which may have the following braking system characteristics: brake pad temperature between approximately 300 and 500 degrees Celsius, high brake pad coefficient of friction, high caliper fluid consumption, and again with the ESB calibrated for the best setting for intuitive feeling.

Another example of this integration is the consideration of brake fade. All systems can experience brake fade due to degradation or poor maintenance of the system. Moving large quantities of air across the friction brakes means that drivers experience very little fade when braking during high-performance and track driving. However, stroke change control logic was developed to provide similar brake fade information to the driver.

FIGS. 9 and 10 are graphs of brake fade considerations regarding pedal stroke and force, and slave cylinder stroke and system pressure. FIG. 9 shows an exemplary control logic/map change to counteract effects of brake fade in an effort to maintain intuitive brake pedal operation by the driver. FIG. 10 shows an exemplary control logic/map change to similarly counteract effects of brake fade, however in this case slave cylinder operation is adjusted rather than the pedal stroke and force required. Depending on whether or not regenerative braking has been activated, the graphs in FIGS. 9 and 10 are representative of the map changes required to maintain intuitive braking system feel. Furthermore, a visual or auditory message may be presented to the vehicle operator indicating brake fade and the system compensation discussed above. The ability of the system to change control logic/maps during instances of brake fade assists the system in achieving intuitive and consistent brake deceleration controllability in all scenarios.

A progressive rate pedal stroke and pedal force workload was established to enable a buildup sensation to the braking force lock point. The ESB system enables precise pressure map tuning to enable constant workload with smooth ratio changes, allowing the driver to maintain the same amount of workload, as the stroke minimizes and the force increases, to establish the buildup feeling. This provides an intuitive pedal feeling with predictable control. Consistent intuitive brake deceleration is achieved though hardware integration and changing ESB pressure maps during track driving. The cooling system manages brake pad and fluid temperatures to stabilize friction coefficient performance under at-limit track lapping. The ESB pressure map is configured to be adjusted based on high-temperature friction coefficient and fluid consumption characteristics to achieve similar feeling as the public road setting. Finally, the use of regenerative brake energy to drive the motor reduces the workload on the engine, contributing to increased fuel economy and reduced $CO_2$ emissions.

V. Alternative Embodiments

While certain embodiments of the invention are described above, and FIGS. 1-10 disclose the best mode for practicing the various inventive aspects, it should be understood that the invention can be embodied and configured in many different ways without departing from the spirit and scope of the invention.

For example, embodiments are disclosed above in the context of the adaptive vehicle braking system 30 configured for use with regenerative braking of the hybrid vehicle 10 as shown in FIGS. 1 and 2. However, embodiments are intended to include or otherwise cover adaptive braking systems integrated in other vehicles having varied drivetrains and propulsion methods, such as pure electric.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A controller for use with a vehicle braking system, the braking system including a brake pedal, and brake assemblies coupled to an actuator, the controller configured to:
  receive data indicative of at least one of a pedal stroke and a pedal force that is applied to the brake pedal;
  determine an actuating force based on the data indicative of at least one of a pedal stroke and a pedal force, where the actuating force is determined using a curve of pedal force versus pedal stroke that is predetermined using discrete portions representing constant incremental area under the curve such that each incremental area corresponds to a constant workload that is applied to the brake pedal; and
  signal the actuator to output the actuating force to the brake assemblies.

2. The controller of claim 1, wherein the controller is configured to select one of a plurality of curves of pedal force versus pedal stroke, where each of the curves corresponds to a respective driving condition.

3. The controller of claim 2, wherein the plurality of curves includes a curve for high performance driving conditions.

4. The controller of claim 2, wherein the plurality of curves includes a curve for stop-and-go driving conditions.

5. The controller of claim 2, wherein the controller is configured to adjust the actuating force to compensate for degradation in performance of the brake assemblies.

6. The controller of claim 1, wherein the constant workload is based on data representing leg-muscle memory movement of vehicle operators.

7. The controller of claim 1, wherein the controller is further configured to adjust the actuating force upon a determination of performance degradation of the brake assemblies.

8. The controller of claim 1, wherein the curve smoothly transitions between the discrete portions, and each of the discrete portions has a varied force to distance of travel ratio.

9. A braking system for a vehicle, comprising:
  a brake pedal;
  at least one brake assembly;
  an actuator configured to engage and disengage the at least one brake assembly; and
  a controller in electronic communication with the actuator, the controller configured to:
    receive data indicative of at least one of a pedal stroke and pedal force that is applied to the brake pedal;
    calculate an actuating force using a curve of pedal force versus pedal stroke that is predetermined using discrete portions representing constant incremental area under the curve such that each incremental area corresponds to a constant workload that is applied to the brake pedal; and signal the actuator to output the actuating force to the at least one brake assembly.

10. The braking system of claim 9, wherein the controller is configured to select one of a plurality of curves of pedal force versus pedal stroke, where each of the curves corresponds to a respective driving condition.

11. The braking system of claim 10, wherein the plurality of curves includes a curve for high performance driving conditions.

12. The braking system of claim 10, wherein the plurality of curves includes a curve for stop-and-go driving conditions.

13. The braking system of claim 10, wherein the controller is configured to adjust the actuating force to compensate for degradation in performance of the brake assemblies.

14. The braking system of claim 9, wherein the constant workload is based on data representing leg-muscle memory movement of vehicle operators.

15. The braking system of claim 9, wherein the controller is further configured to adjust the actuating force upon a determination of performance degradation of the brake assemblies.

16. The braking system of claim 9, wherein the curve smoothly transitions between the discrete portions, and each of the discrete portions has a varied force to distance of travel ratio.

17. A method of calibrating a vehicle braking system that includes brake assemblies coupled to an actuator, the method comprising:

receiving data indicative of at least one of a pedal stroke and a pedal force;

determining an actuating force based on the data indicative of at least one of a pedal stroke and a pedal force, where the actuating force is determined using a curve of pedal force versus pedal stroke that is predetermined using discrete portions representing constant incremental area under the curve such that each incremental area corresponds to a constant workload that is applied to the brake pedal; and signaling the actuator to output the actuating force to the brake assemblies.

18. The method of claim 17, the method further comprising adjusting the actuating force upon a determination of performance degradation of the brake assemblies.

* * * * *